US012238603B2

(12) United States Patent
Kumar et al.

(10) Patent No.: US 12,238,603 B2
(45) Date of Patent: Feb. 25, 2025

(54) POSITIONING ENHANCEMENTS FOR NARROWBAND MOBILE DEVICES

(71) Applicant: QUALCOMM Incorporated, San Diego, CA (US)

(72) Inventors: Akash Kumar, Hyderabad (IN); Amit Jain, San Diego, CA (US); Mangesh Shete, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/752,613

(22) Filed: May 24, 2022

(65) Prior Publication Data

US 2022/0286932 A1 Sep. 8, 2022

Related U.S. Application Data

(62) Division of application No. 16/112,467, filed on Aug. 24, 2018, now Pat. No. 11,368,892.

(51) Int. Cl.
*H04W 4/02* (2018.01)
*G01S 5/00* (2006.01)
*H04W 36/00* (2009.01)

(52) U.S. Cl.
CPC ............... *H04W 4/02* (2013.01); *G01S 5/01* (2020.05); *H04W 36/0088* (2013.01)

(58) Field of Classification Search
CPC ....... H04W 36/24; H04W 4/02; H04W 64/00; H04W 36/0088; H04W 4/70; H04W 72/042; H04W 72/0446; H04W 74/0833; H04W 48/12; H04W 88/02; H04W 80/02; H04W 88/08; H04W 24/10;
(Continued)

(56) References Cited

U.S. PATENT DOCUMENTS

2015/0195811 A1  7/2015 Wu et al.
2018/0042024 A1  2/2018 Nacer et al.
(Continued)

FOREIGN PATENT DOCUMENTS

CA  3051723 A1 *  8/2018  ........ H04W 28/0268
EP  1328133 A2     7/2003
(Continued)

*Primary Examiner* — Marcos L Torres
*Assistant Examiner* — Jing Gao
(74) *Attorney, Agent, or Firm* — QUALCOMM Incorporated

(57) ABSTRACT

Disclosed are techniques for performing positioning measurements at a mobile device during a positioning session with a serving cell. In an aspect, the mobile device determines to trigger a coverage-enhanced (CE) mode before a positioning session timeout for the positioning session expires, continues performance of the positioning measurements during the positioning session with the serving cell while the mobile device remains connected to the serving cell due to the triggered CE mode, determines whether the positioning measurements have been completed or the positioning session timeout has expired, and responsive to the determination that the positioning measurements have been completed or that the positioning session timeout has expired, reports, to a network entity in the wireless communications network, actual handover measurements to enable the network entity to make a handover determination.

20 Claims, 12 Drawing Sheets

(58) Field of Classification Search
CPC ... H04W 72/0413; H04W 16/26; H04W 8/24; H04W 48/20; H04W 72/005; H04W 72/0406; H04W 72/1289; H04W 28/0268; H04W 28/10; H04W 60/04; H04W 68/005; H04W 84/12; H04W 24/02; H04W 28/02; H04W 48/02; H04W 4/50; H04W 52/04; H04W 56/001; H04W 56/0015; H04W 72/04; H04W 72/044; H04W 72/085; H04W 72/10; H04W 74/008; H04W 84/045; H04W 12/08; H04W 16/00; H04W 16/24; H04W 16/30; H04W 36/0055; H04W 36/0061; H04W 36/00835; H04W 36/08; H04W 36/30; H04W 48/04; H04W 48/06; H04W 48/14; H04W 4/029; H04W 52/0206; H04W 76/19; H04W 76/32; H04W 76/28; G01S 5/01; G01S 2205/01; G01S 5/0036; G01S 5/02; G01S 5/10
See application file for complete search history.

(56) References Cited

U.S. PATENT DOCUMENTS

| | | | |
|---|---|---|---|
| 2018/0152924 A1* | 5/2018 | Ouchi | H04W 48/10 |
| 2019/0090168 A1* | 3/2019 | Wichert | H04W 48/16 |
| 2019/0357112 A1 | 11/2019 | Shen et al. | |
| 2020/0068472 A1 | 2/2020 | Kumar et al. | |
| 2021/0120513 A1* | 4/2021 | Siomina | H04W 64/00 |

FOREIGN PATENT DOCUMENTS

| | | | | |
|---|---|---|---|---|
| WO | WO-2018237289 A1 * | 12/2018 | ............ | H04W 24/10 |
| WO | 2019162513 A1 | 8/2019 | | |

* cited by examiner

```
value DL-DCCH-Message ::=
{
   message c1 : rrcConnectionReconfiguration :
      {
         rrc-TransactionIdentifier 0,
         criticalExtensions c1 : rrcConnectionReconfiguration-r8
            {
               measConfig
               {
                  measObjectToAddModList
                  {
                     {
                        measObjectId 1,
                        measObject measObjectEUTRA :
                           {
                              carrierFreq 2175,
                              allowedMeasBandwidth mbw25,
                              presenceAntennaPort1 FALSE,
                              neighCellConfig '01'B,
                              offsetFreq dB0
                           }
                     }
                  },
                  reportConfigToAddModList
                  {
                     {
                        reportConfigId 1,
                        reportConfig reportConfigEUTRA :
                           {
                              triggerType event :
                                 {
                                    eventId eventA3 :
                                       {
                                          a3-Offset 0,
                                          reportOnLeave FALSE
                                       },
                                    hysteresis 0,
                                    timeToTrigger ms640
```

```
value DL-DCCH-Message ::=
{
   message c1 : rrcConnectionReconfiguration :
      {
         rrc-TransactionIdentifier 0,
         criticalExtensions c1 : rrcConnectionReconfiguration-r8
            {
               measConfig
               {
                  measObjectToAddModList
                  {
                     {
                        measObjectId 1,
                        measObject measObjectEUTRA :
                           {
                              carrierFreq 2175,
                              allowedMeasBandwidth mbw25,
                              presenceAntennaPort1 FALSE,
                              neighCellConfig '01'B,
                              offsetFreq dB0
                           }
                     }
                  },
                  reportConfigToAddModList
                  {
                     {
                        reportConfigId 1,
                        reportConfig reportConfigEUTRA :
                           {
                              triggerType event :
                              {
                                 eventId eventA3 :
                                    {
                                       a3-Offset 0,
                                       reportOnLeave FALSE
                                    },
                                 hysteresis 0,
                                 timeToTrigger ms640
```

FIG. 7B

POSITIONING ENHANCEMENTS FOR NARROWBAND MOBILE DEVICES

CROSS-REFERENCE TO RELATED APPLICATIONS

The present application for patent is a divisional of U.S. patent application Ser. No. 16/112,467, entitled "POSITIONING ENHANCEMENTS FOR NARROWBAND MOBILE DEVICES," filed Aug. 24, 2018, assigned to the assignee hereof, and expressly incorporated herein by reference in its entirety.

INTRODUCTION

Aspects of this disclosure relate generally to telecommunications, and more particularly to positioning enhancements for narrowband mobile devices and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided the Institute of Electrical and Electronics Engineers (IEEE), etc.

3GPP recently published Release 13 of the LTE standard, which defines new narrowband (NB) categories of LTE for the Internet of Things (IoT), specifically, Category (Cat) M1, formerly known as enhanced Machine Type Communications (eMTC), and Category NB1, formerly known as NB-IoT. These new categories extend the market reach of LTE, enabling it to cost-effectively support lower data rate applications, including the extremely low power, sensing or monitoring devices envisioned to be everywhere in the IoT. A Cat M1 device utilizes narrowband operation for the transmission and reception of physical channels and signals, in which the maximum carrier bandwidth is reduced to 1.4 MHz with a usable bandwidth of 1.08 MHz, or six (6) LTE resource blocks (RBs). Cat NB1 devices use only 200 KHz carrier bandwidth and 180 KHz usable bandwidth (one (1) LTE RB).

Cat M1 devices are designed to be low throughput, low delay sensitivity, ultra-low cost, low power consumption devices used for various purposes, some of which, like asset tracking, may use positioning. In addition, some network operators are pushing for voice over LTE (VoLTE) support and commercialization on Cat M1 devices.

In cellular networks, "macro cell" base stations provide connectivity and coverage to a large number of users over a certain geographical area. A macro network deployment is carefully planned, designed, and implemented to offer good coverage over the geographical region. To provide higher data transfer speeds, greater numbers of connections, and better coverage, for example, additional "small cell," typically low-power, base stations have recently begun to be deployed to supplement conventional macro networks. Small cell access points may also provide incremental capacity growth, richer user experience, and so on. Small cell operations for LTE networks, for example, have been extended into the unlicensed frequency spectrum, such as the Unlicensed National Information Infrastructure (U-NII) band used by Wireless Local Area Network (WLAN) technologies. This extension of small cell LTE operations is designed to increase spectral efficiency and hence capacity of LTE systems.

For positioning in LTE, where a positioning session is initiated using the LTE Positioning Protocol (LPP), or is being performed at the time of an inter-base station handover (as opposed to an inter-cell handover for the same base station), it is currently not possible to continue such an ongoing positioning session after an inter-base station handover. This is because the measurement context between the mobile device and the serving cell will not be available to the target base station, the positioning session (specifically the communication between the location server and the current base station) does not transfer to the target base station, and therefore the measurement results cannot reach the location server after the base station change. This problem is even greater due to the use of smaller and smaller coverage area small cells such as femto cells and pico cells, as these small coverage area deployments further increase the chance of a handover during an ongoing positioning session.

As a result of a handover during a positioning session, the positioning session will have to be restarted, with the consequence of losing the previously accumulated data and/or of delaying the measurement result. In most cases, the measurements and positioning session will need to be restarted after the handover.

In the scenario of frequent handovers or during a critical positioning session, it would be beneficial to extend and complete the positioning session before a handover. Currently, the only solution is early reporting in the middle of the positioning session. However, there are a number of drawbacks to this solution. For example, the mobile device may not have sufficient measurements to report when asked for early reporting. Additionally, the location server may not ask for the early reporting at the right time and the handover may still occur without the early reporting. Further, the additional mechanism of reporting all of the results accumulated before a handover is only a best effort solution with no guaranteed improvement.

Accordingly, there remains a need for improved techniques to extend and complete a positioning session before a handover.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for performing positioning measurements at a mobile device during a positioning session with a serving cell within a wireless communications network includes determining, by the mobile device, to trigger a Coverage-Enhanced (CE) mode before a positioning session timeout for the positioning session expires, continuing, by the mobile device, performance of the positioning measurements during the positioning session with the serving cell while the mobile device remains connected to the serving cell due to the triggered CE mode, determining, by the mobile device, whether the positioning measurements have been completed or the positioning session timeout has expired, and responsive to the determination that the positioning measurements have been completed or that the positioning session timeout has expired, reporting to a network entity in the wireless communications network, by the mobile device, actual handover measurements to enable the network entity to make a handover determination.

In an aspect, a method for assisting performance of positioning measurements at a mobile device during a positioning session with a serving cell within a wireless communications network includes receiving, at the serving cell from the mobile device, a request to switch to a CE mode before a positioning session timeout for the positioning session expires, determining, by the serving cell, whether or not to switch to the CE mode based on parameters in the request, and based on determining to switch to the CE mode, switching, by the serving cell, to the CE mode.

In an aspect, an apparatus for performing positioning measurements at a mobile device during a positioning session with a serving cell within a wireless communications network includes at least one processor configured to: determine to trigger a CE mode before a positioning session timeout for the positioning session expires, continue performance of the positioning measurements during the positioning session with the serving cell while the mobile device remains connected to the serving cell due to the triggered CE mode, determine whether the positioning measurements have been completed or the positioning session timeout has expired, and responsive to the determination that the positioning measurements have been completed or that the positioning session timeout has expired, cause a transceiver of the mobile device to report to a network entity in the wireless communications network, by the mobile device, actual handover measurements to enable the network entity to make a handover determination.

In an aspect, an apparatus for assisting performance of positioning measurements at a mobile device during a positioning session with a serving cell within a wireless communications network includes a transceiver of the serving cell configured to receive, from the mobile device, a request to switch to a CE mode before a positioning session timeout for the positioning session expires, and at least one processor of the serving cell configured to: determine whether or not to switch to the CE mode based on parameters in the request, and based on a determination to switch to the CE mode, switch to the CE mode.

In an aspect, a non-transitory computer-readable medium storing computer-executable instructions for performing positioning measurements at a mobile device during a positioning session with a serving cell within a wireless communications network includes computer-executable instructions comprising at least one instruction instructing the mobile device to determine to trigger a CE mode before a positioning session timeout for the positioning session expires, at least one instruction instructing the mobile device to continue performance of the positioning measurements during the positioning session with the serving cell while the mobile device remains connected to the serving cell due to the triggered CE mode, at least one instruction instructing the mobile device to determine whether the positioning measurements have been completed or the positioning session timeout has expired, and at least one instruction instructing the mobile device to report, to a network entity in the wireless communications network, responsive to the determination that the positioning measurements have been completed or that the positioning session timeout has expired, actual handover measurements to enable the network entity to make a handover determination.

In an aspect, a non-transitory computer-readable medium storing computer-executable instructions for assisting performance of positioning measurements at a mobile device during a positioning session with a serving cell within a wireless communications network includes computer-executable instructions comprising at least one instruction instructing the serving cell to receive, from the mobile device, a request to switch to a CE mode before a positioning session timeout for the positioning session expires, at least one instruction instructing the serving cell to determine whether or not to switch to the CE mode based on parameters in the request, and at least one instruction instructing the serving cell to switch, based on a determination to switch to the CE mode, to the CE mode.

In an aspect, an apparatus for performing positioning measurements at a mobile device during a positioning session with a serving cell within a wireless communications network includes a means for processing of the mobile device configured to determine to trigger a CE mode before a positioning session timeout for the positioning session expires, continue performance of the positioning measurements during the positioning session with the serving cell while the mobile device remains connected to the serving cell due to the triggered CE mode, determine whether the positioning measurements have been completed or the positioning session timeout has expired, and responsive to the determination that the positioning measurements have been completed or that the positioning session timeout has expired, cause a means for communicating of the mobile device to report, to a network entity in the wireless communications network, actual handover measurements to enable the network entity to make a handover determination.

In an aspect, an apparatus for assisting performance of positioning measurements at a mobile device during a positioning session with a serving cell within a wireless communications network includes means for communicating of the serving cell configured to receive, from the mobile device, a request to switch to a CE mode before a positioning session timeout for the positioning session expires, and means for processing of the serving cell configured to: determine whether or not to switch to the CE mode based on parameters in the request, and switch, based on a determination to switch to the CE mode, to the CE mode.

Other objects and advantages associated with the aspects disclosed herein will be apparent to those skilled in the art based on the accompanying drawings and

BRIEF DESCRIPTION OF THE DRAWINGS

The accompanying drawings are presented to aid in the description of various aspects of the disclosure and are provided solely for illustration of the aspects and not limitation thereof.

FIGS. 7A and 7B illustrate exemplary portions of pseudo-code according to aspects of the disclosure.

DETAILED DESCRIPTION

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
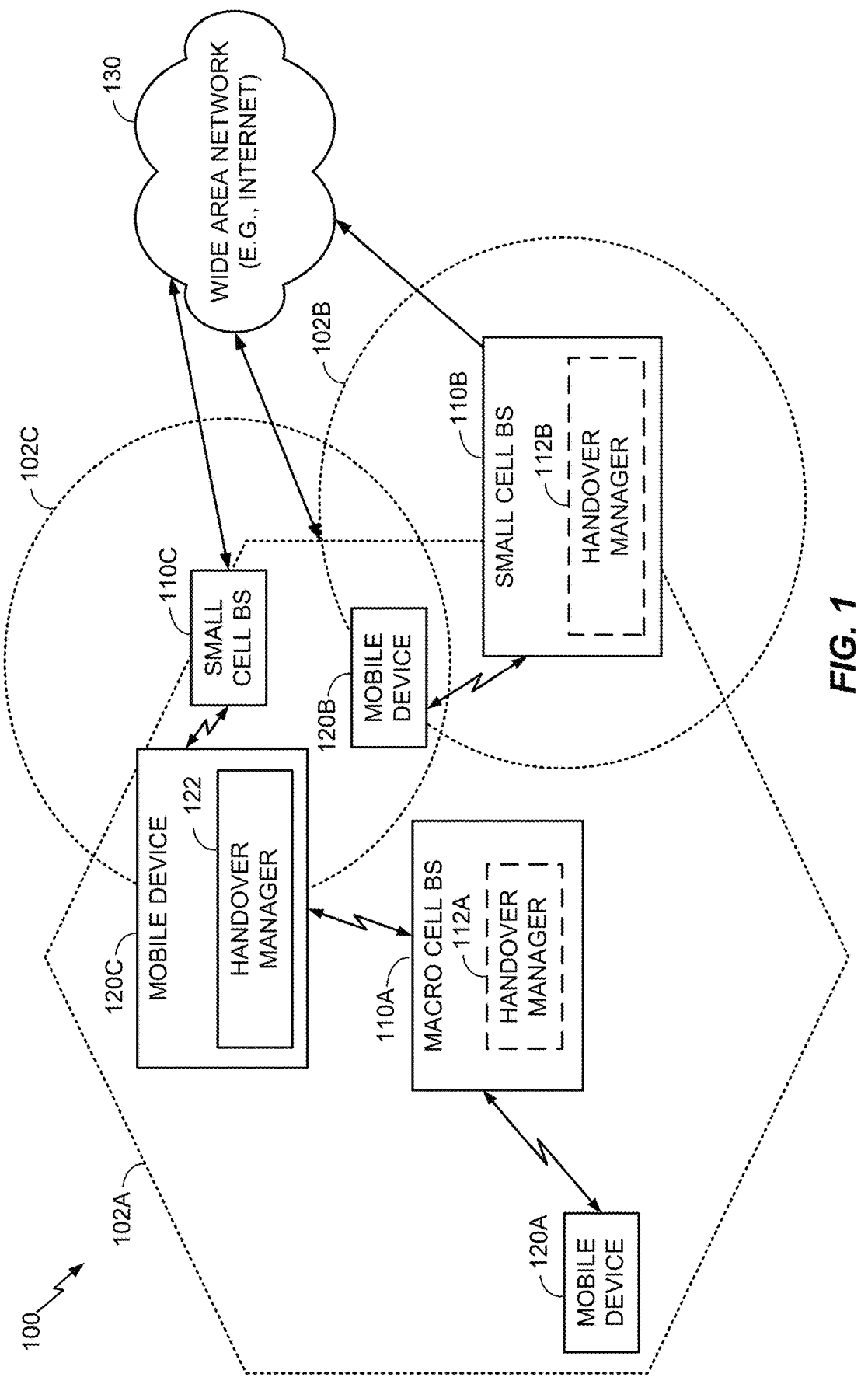
FIG. 1 illustrates an example mixed-deployment wireless communication system including macro cell base stations and small cell base stations.

FIG. 1 illustrates an example mixed-deployment wireless communication system, in which small cell base stations are deployed in conjunction with and to supplement the coverage of macro cell base stations. As used herein, the term "small cells" generally refer to a class of low-powered base stations that may include or be otherwise referred to as femto cells, pico cells, micro cells, etc. As noted in the background above, they may be deployed to provide improved signaling, incremental capacity growth, richer user experience, and so on.

The illustrated wireless communication system 100 is a multiple-access system that is divided into a plurality of cells 102 and configured to support communication for a number of users. Communication coverage in each of the cells 102 is provided by a corresponding base station 110, which interacts with one or more mobile devices 120 via downlink (DL) and/or uplink (UL) connections. In general, the DL corresponds to communication from a base station 110 to a mobile device 120, while the UL corresponds to communication from a mobile device 120 to a base station 110.

As will be described in more detail below, these different entities may be variously configured in accordance with the teachings herein to provide or otherwise support the positioning enhancements for narrowband mobile devices discussed briefly above. For example, one or more of the mobile devices 120 may include a handover management module ("handover manager") 122 that performs, or causes the mobile device 120 to perform, the operations described herein. Likewise, one or more of the base stations 110 may include a handover management module ("handover manager") 112 that performs, or causes the base station 110 to perform, the operations described herein. In the example of FIG. 1, the macro cell base station 110A includes an optional handover management module 112A and the small cell base station 110B includes an optional handover management module 112B.

As used herein, the terms "mobile device" and "base station" are not intended to be specific or otherwise limited to any particular Radio Access Technology (RAT), unless otherwise noted. In general, such mobile devices may be any mobile wireless communication device (e.g., a cellular phone, router, tablet computer, laptop computer, IoT device, wearable device, etc.) capable of being moved from one location to another and capable of communicating over a wireless communications network, and may be alternatively referred to in different RAT environments as an Access Terminal (AT), a Mobile Station (MS), a Subscriber Station (STA), a User Equipment (UE), etc. Similarly, a base station may operate according to one of several RATs in communication with mobile devices depending on the network in which it is deployed, and may be alternatively referred to as an Access Point (AP), a Network Node, a NodeB, an evolved NodeB (eNB), a gNodeB (gNB), etc. In addition, in some systems, a base station may provide purely edge node signaling functions while in other systems it may provide additional control and/or network management functions.

Returning to FIG. 1, the different base stations 110 include an example macro cell base station 110A and two example small cell base stations 110B, 110C. The macro cell base station 110A is configured to provide communication coverage within a macro cell coverage area 102A, which may cover a few blocks within a neighborhood or several square miles in a rural environment. Meanwhile, the small cell base stations 110B, 110C are configured to provide communication coverage within respective small cell coverage areas 102B, 102C, with varying degrees of overlap existing among the different coverage areas. In some systems, each cell may be further divided into one or more sectors (not shown).

Turning to the illustrated connections in more detail, the mobile device 120A may transmit and receive messages via a wireless link with the macro cell base station 110A, the message including information related to various types of communication (e.g., voice, data, multimedia services, associated control signaling, etc.). The mobile device 120B may similarly communicate with the small cell base station 110B via another wireless link, and the mobile device 120C may similarly communicate with the small cell base station 110C via another wireless link. In addition, in some scenarios, the mobile device 120C, for example, may also communicate with the macro cell base station 110A via a separate wireless link in addition to the wireless link it maintains with the small cell base station 110C.

As is further illustrated in FIG. 1, the macro cell base station 110A may communicate with a corresponding wide area network 130, via a wired link or via a wireless link, while the small cell base stations 110B, 110C may also similarly communicate with the wide area network 130, via their own wired or wireless links. For example, the small cell base stations 110B, 110C may communicate with the wide area network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The wide area network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the wide area network 130 includes network variations such as the public Internet, a private network within the Internet, a secure network within the Internet, a private network, a public network, a value-added network, an intranet, and the like. In certain systems, the wide area network 130 may also comprise a Virtual Private Network (VPN).

Accordingly, it will be appreciated that the macro cell base station 110A and/or either or both of the small cell base stations 110B, 110C may be connected to the wide area network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a mobile device 120 moves through such a mixed communication network environment that provides both macro cell and small cell coverage, the mobile device 120 may be served in certain locations by macro cell base stations (e.g., macro cell base station 110A), at other locations by small cell base stations (e.g., small cell base stations 110B, 110C), and, in some scenarios, by both macro cell and small cell base stations.

For their wireless air interfaces, each base station 110 may operate according to one of several RATs depending on the network in which it is deployed. These networks may include, for example, CDMA networks, TDMA networks, FDMA networks, OFDMA networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). LTE is a release of UMTS that uses E-UTRA. UTRA, E-UTRA, GSM, UMTS, and LTE are described in documents from 3GPP. cdma2000 is described in documents from 3GPP2. These documents are publicly available.

Figure 2:
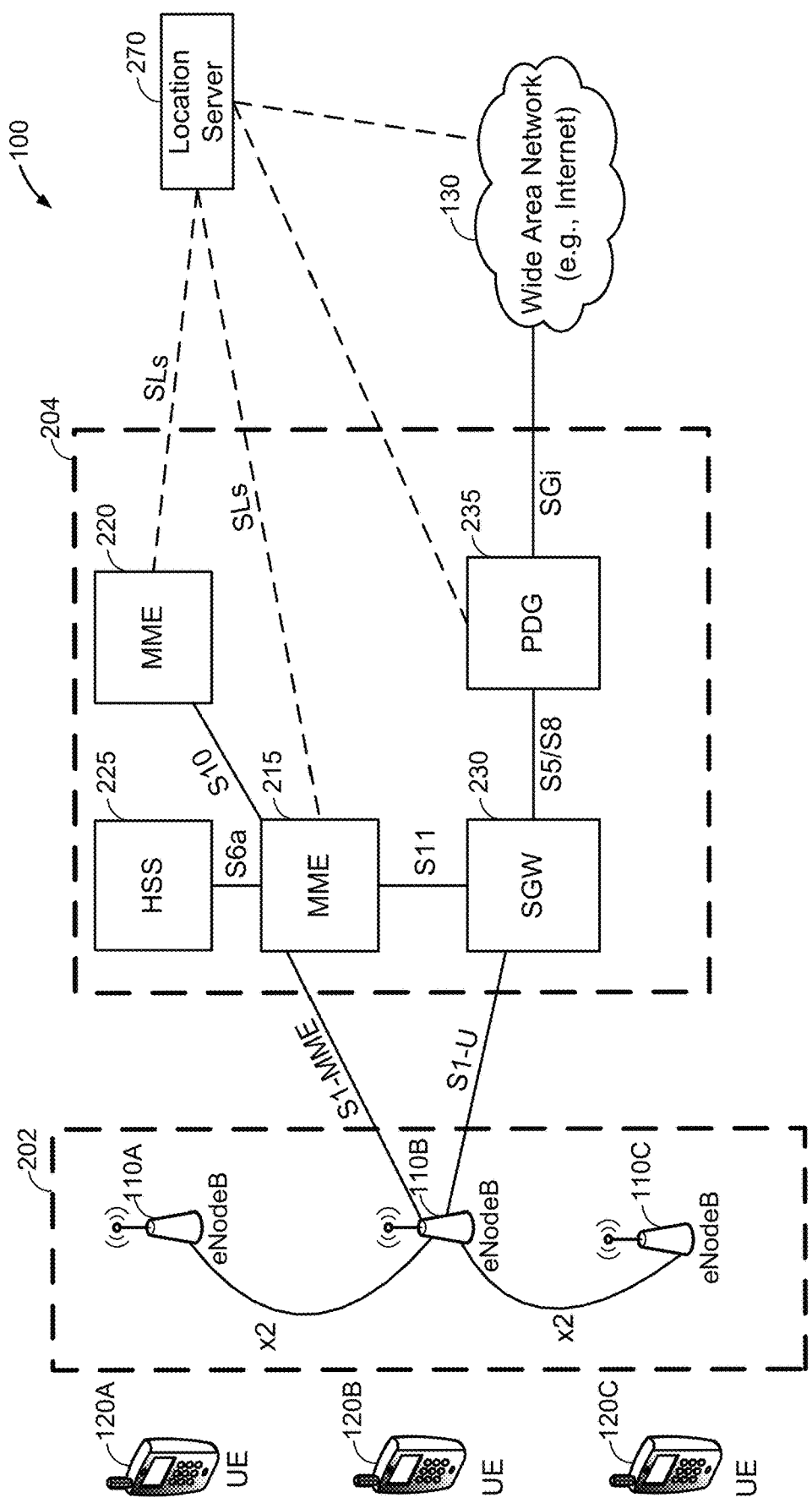
FIG. 2 illustrates an example configuration of a Radio Access Network (RAN) and a portion of a core network that is based on an LTE network in accordance with an aspect of the disclosure.

Base stations 110 may be referred to as a RAN. FIG. 2 illustrates an example configuration of a RAN 202 and a portion of a core network 204 (which includes the "backhaul" between base stations 110 and the wide area network 130) in which the wireless communication system 100 operates according to the LTE protocol, in accordance with an aspect of the disclosure. In LTE, mobile devices (e.g., mobile devices 120) are typically referred to as "UEs," and base stations (e.g., base stations 110) are typically referred to as "eNodeBs." Thus, referring to FIG. 2, the base stations 110 of the RAN 202 are configured as a plurality of eNodeBs 110, which support LTE wireless access, and the mobile devices 120 are configured as a plurality of UEs 120. In FIG. 2, the core network 204 includes a plurality of Mobility Management Entities (MMEs) 215 and 220, a Home Subscriber Server (HSS) 225, a Serving Gateway (SGW) 230 and a Packet Data Network Gateway (PDG) 235. Network interfaces between these components, the RAN 202, a location server 270 and the wide area network/Internet 130 are illustrated in FIG. 2 and are defined in Table 2 (below) as follows:

TABLE 1

Evolved Packet System (EPS)/LTE Core
Network Connection Definitions

| Network Interface | Description |
| --- | --- |
| S1-MME | Reference point for the control plane protocol between RAN 202 and MME 215. |
| S1-U | Reference point between RAN 202 and SGW 230 for the per bearer user plane tunneling and inter-eNodeB path switching during handover. |
| S5 | Provides user plane tunneling and tunnel management between SGW 230 and PDG 235. It is used for SGW relocation due to UE mobility and if the SGW 230 is to connect to a non-collocated PDG for Packet Data Network (PDN) connectivity. |
| S6a | Enables transfer of subscription and authentication data for authenticating/authorizing user access to the evolved system (Authentication, Authorization, and Accounting (AAA) interface) between MME 215 and HSS 225. |
| S8 | Inter-PLMN reference point providing user and control plane between the SGW 230 in a Visited Public Land Mobile Network (VPLMN) and the PDG 235 in a Home Public Land Mobile Network (HPLMN). S8 is the inter-PLMN variant of S5. |
| S10 | Reference point between MMEs 215 and 220 for MME relocation and MME to MME information transfer. |
| S11 | Reference point between MME 215 and SGW 230. |
| SGi | Reference point between the PDG 235 and a packet data network, shown in FIG. 2 as the wide area network/Internet 130. The packet data network may be an operator external public or private packet data network or an intra-operator packet data network (e.g., for provision of Internet Protocol (IP) Multimedia Subsystem (IMS) services). |

TABLE 1-continued

Evolved Packet System (EPS)/LTE Core
Network Connection Definitions

| Network Interface | Description |
| --- | --- |
| SLs | Interface between an MME and the location server 270 in the event that location server 270 is or contains an Enhanced Serving Mobile Location Center (E-SMLC) |
| X2 | Reference point between two different eNodeBs used for UE handoffs. |

A high-level description of the components shown in FIG. 2 will now be provided. However, these components are each well-known in the art from various 3GPP Technical Specifications (TSs), such as TS 23.401, and the description contained herein is not intended to be an exhaustive description of all functionalities performed by these components.

Referring to FIG. 2, the eNodeBs 110 are configured to provide LTE and/or Cat M1 radio access to UEs 120 and to provide signaling and voice/data connectivity between any UE 120 and elements in core network 204, such as MME 215 and SGW 230. The eNodeBs 110 may also be configured to broadcast a Positioning Reference Signal (PRS) signals to nearby UEs 120 to enable any UE 120 to make measurements of PRS timing differences between pairs of eNodeBs 110 and thereby enable a location estimate of the UE 120 to be obtained by the UE 120 itself or by a location server (e.g., location server 270) to which the timing difference measurements may be sent using, e.g., OTDOA positioning.

The term "location estimate" is used herein to refer to an estimate of a location for a UE (e.g., any of UEs 120), which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A location estimate may also be referred to as a "location," a "position," a "fix," a "position fix," a "location fix," a "position estimate," a "fix estimate," or by some other term. The means of obtaining a location estimate may be referred to generically as "positioning," "locating," or "position fixing." A particular solution for obtaining a location estimate may be referred to as a "location solution." A particular method for obtaining a location estimate as part of a location solution may be referred to as a "position method" or as a "positioning method."

Referring to FIG. 2, the MMEs 215, and 220 are configured to support network attachment of UEs (e.g., UEs 120), mobility of UEs, and bearer assignment to UEs. MME functions include: Non-Access Stratum (NAS) signaling to UEs, NAS signaling security, mobility management for inter- and intra-technology handovers of UEs, PDG and SGW selection, and MME selection for UE handovers with MME change.

Referring to FIG. 2, the SGW 230 is the gateway that terminates the user plane interface toward the RAN 202. The functions of the SGW 230 include: mobility anchor point, packet routing and forwarding, and transport level packet marking in the uplink and the downlink (e.g., setting the DiffServ Code Point (DSCP) based on a Quality of Service (QoS) Class Identifier (QCI) of an associated EPS bearer).

Referring to FIG. 2, the PDG 235 is the gateway that terminates the SGi user plane interface toward the PDN, e.g., the wide area network 130. If a UE is accessing multiple PDNs, there may be more than one PDG for that UE. PDG 235 functions include: packet filtering (e.g., using deep packet inspection), UE IP address allocation, transport level packet marking in the uplink and downlink (e.g., setting the DSCP based on the QCI of an associated EPS bearer), accounting for inter operator charging, uplink and downlink bearer binding, Uplink and downlink rate enforcement and service level rate enforcement, and UL bearer binding. The PDG 235 may provide PDN connectivity to both GSM/EDGE Radio Access Network (GERAN)/Universal Terrestrial Radio Access Network (UTRAN)-only UEs, and Enhanced UTRAN (E-UTRAN)-capable UEs using any of E-UTRAN, GERAN, or UTRAN. The PDG 235 may provide PDN connectivity to E-UTRAN-capable UEs using E-UTRAN only over the S5/S8 interface.

In FIG. 2, the location server 270 is shown as connected to one or more of the wide area network 130, the PDG 235, MME 220, and MME 215. The connections to MME 215 and MME 220 are applicable when location server 270 is or contains an E-SMLC. The connections to the wide area network 130 and/or to the PDG 235 are applicable when location server 270 is or contains a Secure User Plane Location (SUPL) Location Platform (SLP), such a Home SLP (H-SLP), Emergency SLP (E-SLP), or Discovered SLP (D-SLP). Location server 270 may be used (i) to obtain a location for any of UEs 120 (e.g., from signal measurements obtained and transferred by any of UEs 120) and/or (ii) to provide assistance data to any of UEs 120 to enable any of UEs 120 to acquire and measure signals (e.g., signals from one or more of eNodeBs 110) and, in some cases, compute a location from these signal measurements. Examples of assistance data can be orbital and timing data for Global Positioning System (GPS) or other Global Navigation Satellite System (GNSS) satellites when GPS or GNSS positioning is used, or information concerning downlink transmission from eNodeBs nearby to a UE (e.g., any of eNodeBs 110) when OTDOA is used for positioning.

Figure 3:
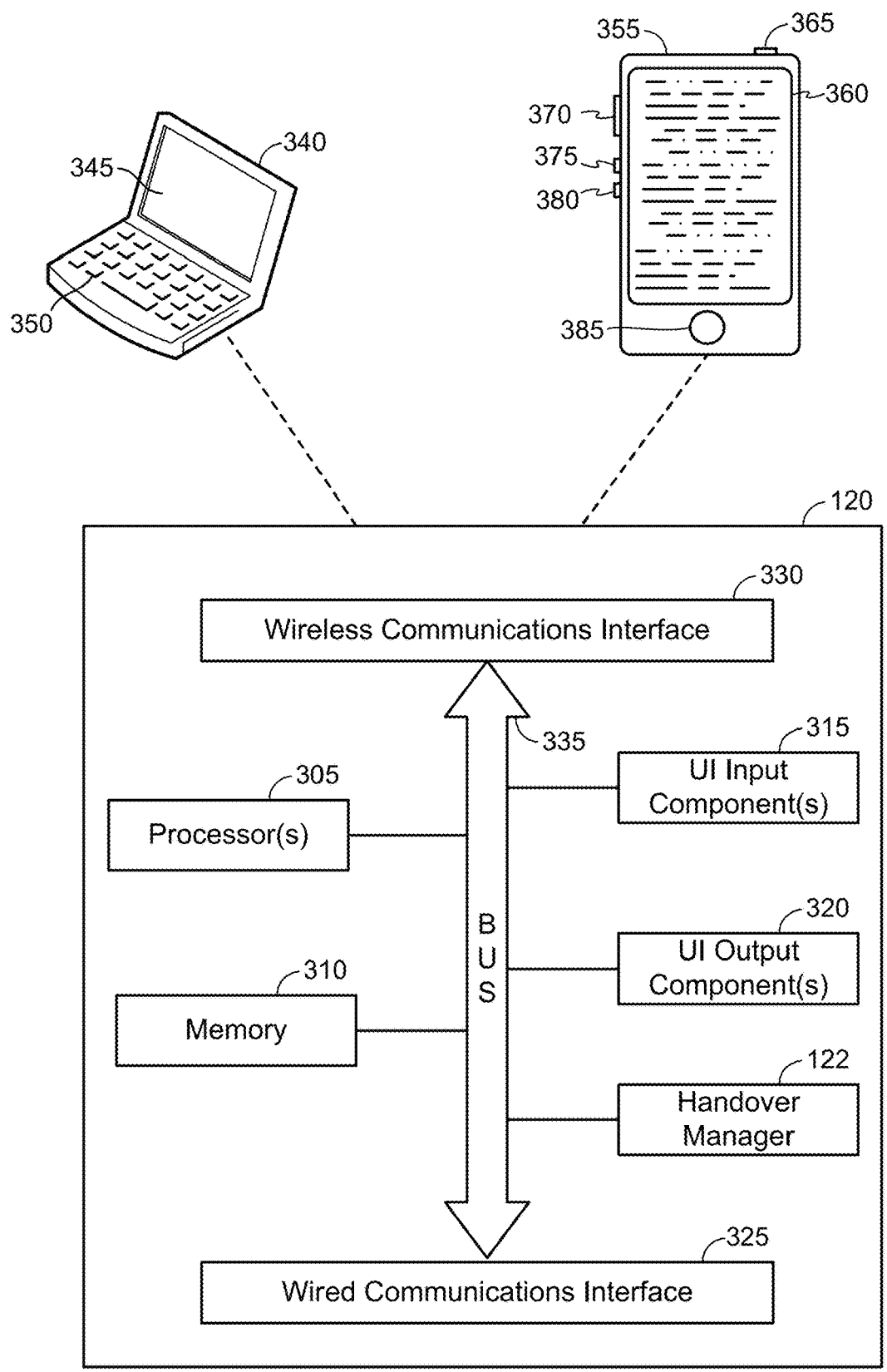
FIG. 3 illustrates an example access terminal in accordance with an aspect of the disclosure.

FIG. 3 illustrates a mobile device 120 in accordance with an aspect of the disclosure. In an aspect, the mobile device 120 includes one or more processors 305 (e.g., one or more ASICs, one or more digital signal processors (DSPs), a multicore processor, one or more communication controllers, etc.) and a memory 310 (e.g., Random Access Memory (RAM), Read-Only Memory (ROM), erasable programmable ROM (EPROM), Electrically Erasable Programmable ROM (EEPROM), flash cards, or any memory common to computer platforms). The mobile device 120 also includes one or more user interface (UI) input components 315 (e.g., a keyboard and mouse, a touchscreen, a microphone, one or more buttons such as volume or power buttons, etc.) and one or more UI output components 320 (e.g., speakers, a display screen, a vibration device for vibrating the mobile device 120, etc.).

The mobile device 120 further includes a wired communications interface 325 and a wireless communications interface 330. In an example aspect, the wired communications interface 325 can be used to support wired local connections to peripheral devices (e.g., a Universal Serial Bus (USB) connection, a mini USB or Lightning connection, a headphone jack, a graphics port, such as serial, Video Graphics Array (VGA), High-Definition Multimedia Interface (HDMI), Digital Visual Interface (DVI), or DisplayPort, audio ports, and so on) and/or to a wired access network (e.g., via an Ethernet cable or another type of cable that can function as a bridge to the wired access network such as HDMI v1.4 or higher, etc.). In another example aspect, the wireless communications interface 330 includes one or more wireless transceivers for communication in accordance with a local wireless communications protocol (e.g., WLAN or WiFi, WiFi Direct, LTE-Direct, Bluetooth, etc.). The wireless communications interface 330 may also include one or more wireless transceivers for communication with a cellular RAN (e.g., via CDMA, W-CDMA, TDMA, FDMA, OFDM, GSM, or other protocols that may be used in a wireless communications network or a data communications network). The various components 305-330 of the mobile device 120 can communicate with each other via a bus 335.

Referring to FIG. 3, the mobile device 120 may correspond to any type of wireless mobile communications device, including but not limited to a smart phone, a laptop computer, a tablet computer, a wearable device (e.g., a pedometer, a smart watch, etc.), and so on. Two particular implementation examples of the mobile device 120 are depicted in FIG. 3, which are illustrated as laptop 340 and touchscreen device 355 (e.g., a smart phone, a tablet computer, etc.). The laptop 340 includes a display screen 345 and a UI area 350 (e.g., keyboard, touchpad, power button, etc.), and while not shown, the laptop 340 may include various ports as well as wired and/or wireless transceivers (e.g., Ethernet card, WiFi card, broadband card, etc.).

The touchscreen device 355 is configured with a touchscreen display 360, peripheral buttons 365, 370, 375, and 380 (e.g., a power control button, a volume or vibrate control button, an airplane mode toggle button, etc.), and at least one front-panel button 385 (e.g., a Home button, etc.), among other components, as is known in the art. While not shown explicitly as part of the touchscreen device 355, the touchscreen device 355 can include one or more external antennas and/or one or more integrated antennas that are built into the external casing of the touchscreen device 355, including but not limited to WiFi antennas, cellular antennas, satellite position system (SPS) antennas (e.g., GPS antennas), and so on.

The mobile device 120 may also include the handover manager 122. Although the handover manager 122 is illustrated as connected to the bus 335, the handover manager 122 may be a software module stored in the memory 310 and executable by one or more of processor(s) 305, a separate hardware circuit coupled to the bus 335, a sub-component of one or more of processor(s) 305, a combination of hardware and software, or the like.

In an aspect, the handover manager 122 may perform, or execution of the handover manager 122 may cause the mobile device 120 to perform, the operations described herein. Thus, for example, the processor(s) 305, the memory 310, the wireless communications interface 330, the wired communications interface 325, and/or the handover manager 122 may all be used cooperatively to load, store, and execute the various operations disclosed herein, and as such, the logic to perform these operations may be distributed over various elements. Alternatively, the functionality could be incorporated into one discrete component (e.g., the handover manager 122). Therefore, the features of the mobile device 120 are to be considered merely illustrative and the disclosure is not limited to the illustrated features or arrangement.

For example, where the mobile device 120 is configured to perform positioning measurements during a positioning session with a serving cell (e.g., base station 110) within a wireless communications network, the handover manager 122, or the processor(s) 305 based on execution of the handover manager 122, in conjunction with the wireless communications interface 330, may be configured to determine to trigger a CE mode before a positioning session timeout for the positioning session expires, continue performance of the positioning measurements during the positioning session with the serving cell while the mobile device remains connected to the serving cell due to the triggered CE mode, and determine whether the positioning measurements have been completed or the positioning session timeout has expired. The wireless communications interface 330 may be configured to, responsive to the determination that the positioning measurements have been completed or that the positioning session timeout has expired, report to a network entity (e.g., base station 110) in the wireless communications network actual handover measurements to enable the network entity to make a handover determination.

Figure 4:
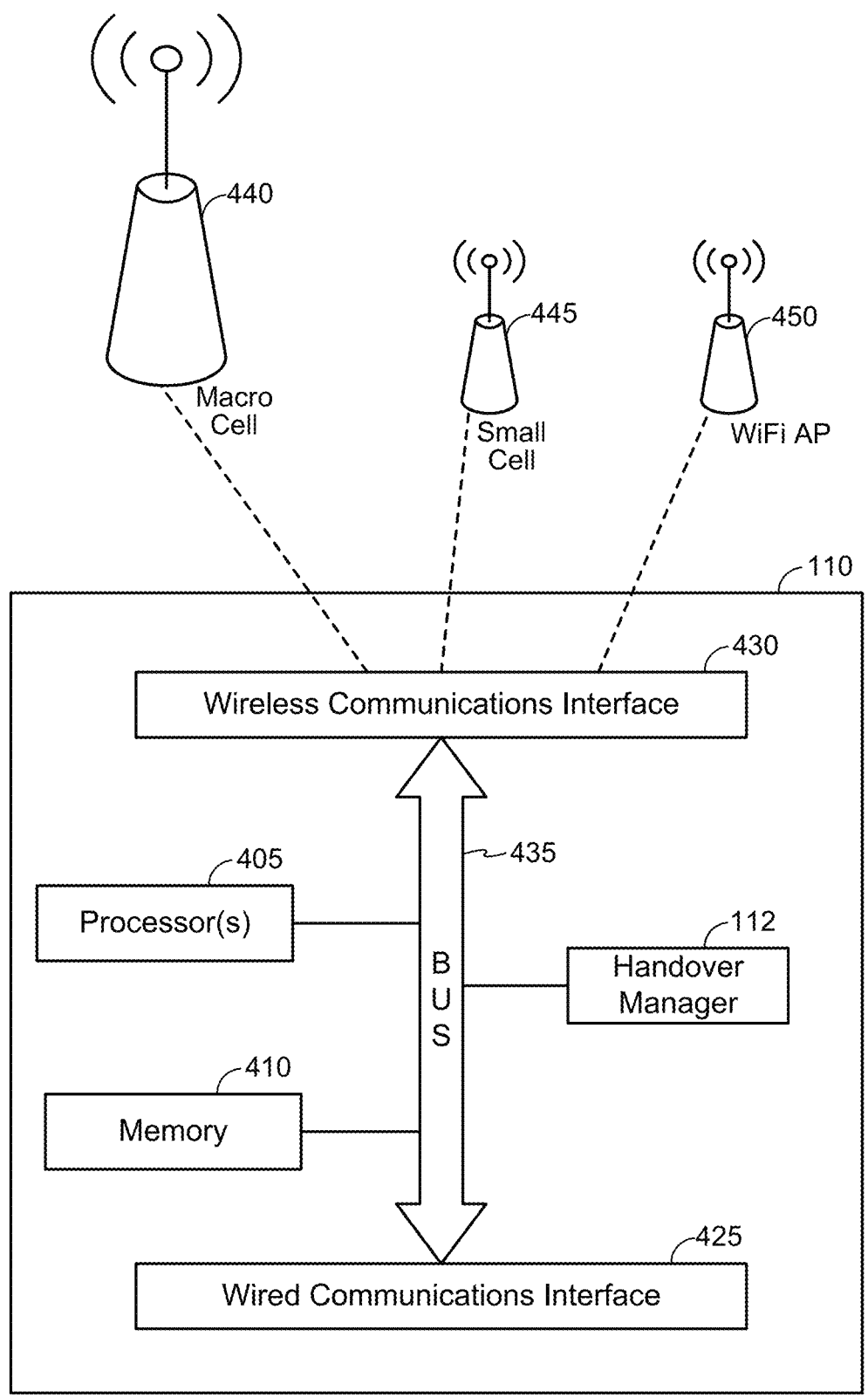
FIG. 4 illustrates an example base station in accordance with an aspect of the disclosure.

FIG. 4 illustrates an example base station 110 in accordance with an aspect of the disclosure. The base station 110 includes one or more processors 405 (e.g., one or more ASICs, one or more DSPs, a multicore processor, one or more communication controllers, etc.) and a memory 410 (e.g., RAM, ROM, EEPROM, flash cards, or any memory common to computer platforms). The base station 110 further includes a wired communications interface 425 and a wireless communications interface 430. The various components 405-430 of the base station 110 can communicate with each other via a bus 435.

In an example aspect, the wired communications interface 425 can be used to connect to one or more backhaul components. Depending on the network infrastructure where the base station 110 is deployed, the one or more backhaul components to which the base station 110 is connected via the wired communications interface 425 may include a base station controller (BSC), a radio network controller (RNC), other base stations 110 (e.g., other eNodeBs via X2 connections as defined in LTE), core network components, such as the S-GW 230 or the MME 220, and so on, some examples of which are illustrated in FIG. 2.

In another example aspect, the wireless communications interface 430 may include one or more wireless transceivers for communication in accordance with a wireless communications protocol. The wireless communications protocol may be based on the configuration of the base station 110. For example, if the base station 110 is implemented as a macro cell base station 440 (which may correspond to macro cell base station 110A in FIG. 1 and eNodeBs 110A-C in FIG. 2) or a small cell base station 445 (which may correspond to small cell base stations 110B and 110C in FIG. 1), the wireless communications interface 430 may include one or more wireless transceivers configured to implement a cellular protocol (e.g., CDMA, W-CDMA, GSM, 3G, 4G, 5G, etc.). In another example, if the base station 110 is implemented as WLAN access point 450, the wireless communications interface 430 may include one or more wireless transceivers configured to implement a WiFi (or 802.11) protocol (e.g., 802.11a, 802.11b, 802.11g, 802.11n, etc.).

The base station 110 may also include the handover manager 112. Although the handover manager 112 is illustrated as connected to the bus 435, the handover manager 112 may be a software module stored in the memory 410 and executable by one or more of processor(s) 405, a separate hardware circuit coupled to the bus 435, a sub-component of one or more of processor(s) 405, a combination of hardware and software, or the like.

In an aspect, the handover manager 112 may perform, or execution of the handover manager 112 may cause the base station 110 to perform, the operations described herein. Thus, for example, the processor(s) 405, the memory 410, the wireless communications interface 430, the wired communications interface 425, and/or the handover manager 112 may all be used cooperatively to load, store, and execute the various operations disclosed herein, and as such, the logic to perform these operations may be distributed over various elements. Alternatively, the functionality could be incorporated into one discrete component (e.g., the handover manager 112). Therefore, the features of the base station 110 are to be considered merely illustrative and the disclosure is not limited to the illustrated features or arrangement.

For example, where the base station 110 is configured to assist performance of positioning measurements at a mobile device (e.g., mobile device 120) during a positioning session, the wireless communications interface 430 may be configured to receive, from the mobile device, a request to switch to a CE mode before a positioning session timeout for the positioning session expires. The handover manager 112, or processor(s) 405 as directed by execution of handover manager 112, may be configured to determine whether or not to switch to the CE mode based on parameters in the request and, based on determining to switch to the CE mode, switch to the CE mode.

Figure 5:
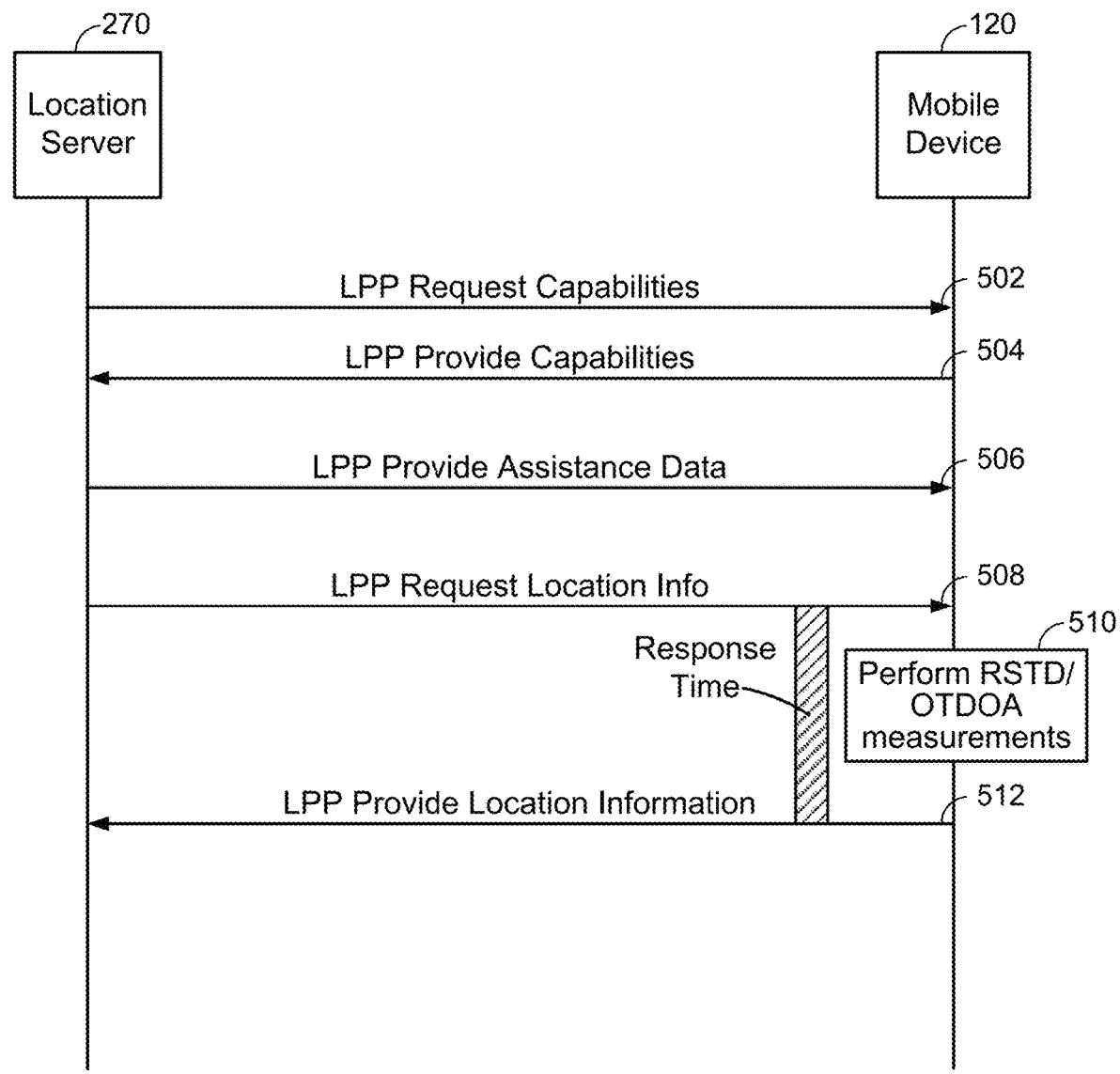
FIG. 5 illustrates a conventional LPP call flow between the wireless mobile device and the location server for performing positioning operations.

FIG. 5 illustrates a conventional LPP call flow between a mobile device 120 and the location server 270 for performing positioning operations. As illustrated in FIG. 5, positioning of the mobile device 120 is supported via an exchange of LPP messages between the mobile device 120 and the location server 270. The LPP messages may be exchanged between the mobile device 120 and the location server 270 via one or more intermediate networks, such as RAN 202 (e.g., via eNodeB 110) and core network 204 (e.g., via MME 215 with a control plane location solution when location server 270 comprises an E-SMLC or via PDG 235 and SGW 230 with a user plane location solution when location server 270 comprises an SLP). The LPP messages and the procedures that they support are described in 3GPP TS 36.355. The procedure shown in FIG. 5 may be used to position the mobile device 120 in order to support various location-related services, such as navigation for mobile device 120 (or for the user of mobile device 120), or for routing, or for other location services.

At 502, the location server 270 sends an LPP capabilities request to the mobile device 120. At 504, the mobile device 120 responds with its LPP capabilities. At 506, the location server 270 sends assistance data for LPP positioning operations to the mobile device 120. At 508, the location server 270 sends a request for location information to the mobile device 120. At 510, the mobile device 120 performs RSTD and/or OTDOA measurements. At 512, the mobile device 120 provides its location information to the location server 270, such as the RSTD and/or OTDOA measurements. Note that the time between the request for location information at 508 and the response at 512 is the "response time."

Although FIG. 5 only illustrates the mobile device 120 and the location server 270, the LPP messages exchanged between the mobile device 120 and the location server 270 are passed from one to the other through the serving cell of the mobile device 120 (e.g., a base station 110). Currently, it is not possible to continue the positioning session illustrated in FIG. 5 if it is interrupted by an inter-base station handover because the measurement context between the mobile device and the serving cell will not available to the target base station. More specifically, the positioning session (specifically the communication between the location server 270 and the serving base station) does not transfer to the target base station, and therefore, the measurement results cannot reach the location server 270 after the base station change.

As noted above, LTE has been extended into narrowband frequencies as LTE Cat M1. LTE Cat M1 is a low-power wide-area (LPWA) air interface that can be used to connect IoT and Machine-2-Machine (M2M) devices with medium data rate requirements (e.g., 375 kb/s upload and download speeds in half duplex mode). It enables longer battery lifecycles and greater in-building range, as compared to standard cellular technologies such as 2G, 3G, or LTE. LTE Cat M1 is ideal for mobile use cases because it handles handover between base stations much like LTE. For example, if a Cat M1 mobile device crosses several different network cells, it will behave the same as an LTE mobile device and not drop the connection.

Figure 6:
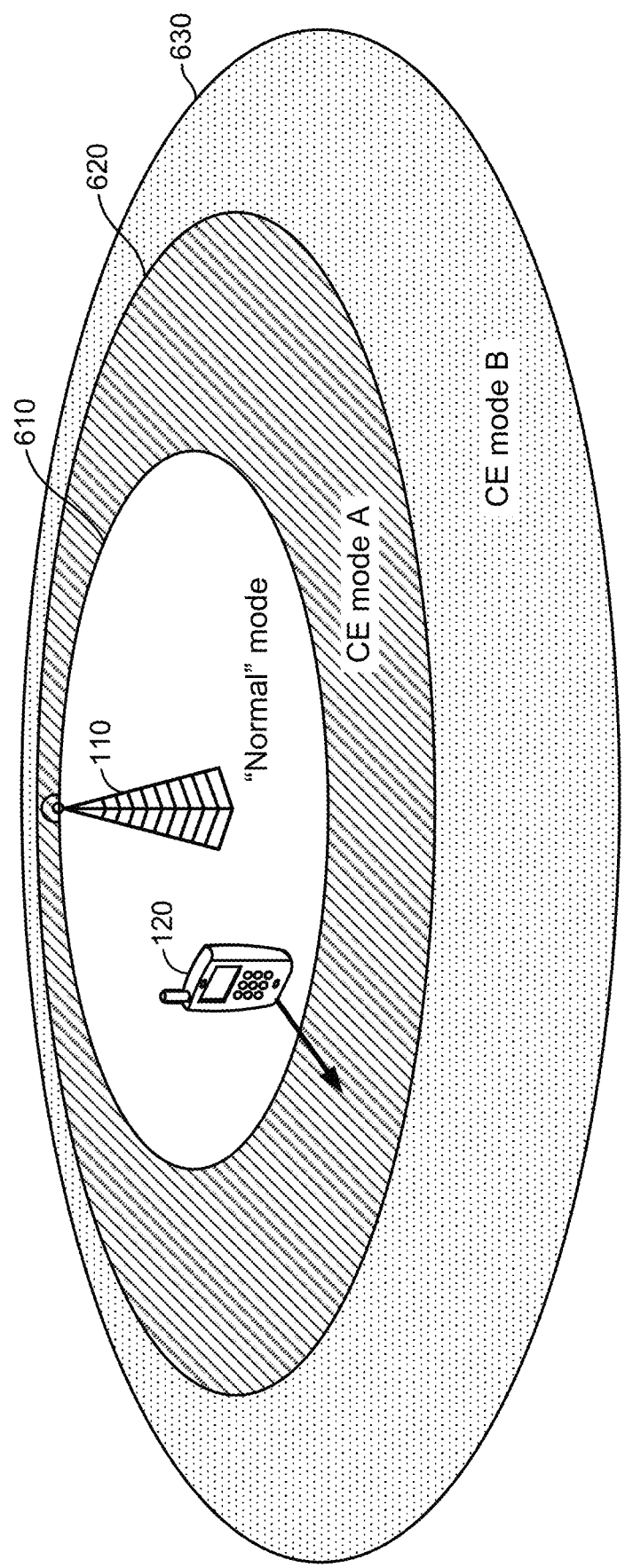
FIG. 6 illustrates the relative coverage areas of a Normal Coverage (NC) Mode, a CE Mode A, and a CE Mode B.

LTE Cat M1 capable devices can operate in three different modes, NC Mode, CE Mode A, and CE Mode B. FIG. 6 illustrates the relative coverage areas of these modes. Specifically, FIG. 6 illustrates a base station 110 (referred to as an eNodeB in LTE, and which may be a small cell or macro cell base station) that can serve mobile devices (UEs in LTE) in an NC Mode coverage area 610, a CE Mode A coverage area 620, and a CE Mode B coverage area 630. As shown in FIG. 6, NC Mode coverage area 610 is closest to the base station 110, CE Mode A coverage area 620 is outside the NC Mode coverage area 610, and CE Mode B coverage area 630 is outside the CE Mode A coverage area 620, providing "deeper" coverage than that provided by CE Mode A. In the example of FIG. 6, a mobile device 120 within NC Mode coverage area 610 is moving into CE Mode A coverage area 620.

The operation mode (NC Mode, CE Mode A, or CE Mode B) of the mobile device 120 is configured by the base station 110. In general, the selected CE mode depends on the CE level, which specifies the number of repetitions of the Physical Random Access Channel (PRACH). Specifically, CE Mode A corresponds to Levels 1 and 2 (no repetitions for PRACH and small number of repetitions for PRACH, respectively) and CE Mode B corresponds to Levels 3 and 4 (medium number of repetitions for PRACH and large number of repetitions for PRACH, respectively).

Operation in CE Mode A would provide an equivalent coverage to that of LTE Cat 1 (another narrowband LTE protocol for IoT). The difference in coverage between LTE Cat M1 (which utilizes 1.4 Mhz of bandwidth) and LTE Cat 1 (which utilizes 20 MHz of bandwidth) due to operating in narrowband and with reduced uplink transmit power is compensated for in LTE Cat M1 by utilizing a small number of repetitions (Levels 1 and 2) of the PRACH. CE Mode B provides up to 15 dB coverage enhancement with reference to that of LTE Cat 1. This mode is designed to be used in very poor propagation conditions.

There is a mechanism to enable a mobile device operating in LTE Cat M1 to transition between NC Mode and CE Mode and vice versa. Each cell of a base station broadcasts cell-specific information in a Master Information Block (MIB) and a System Information Block (SIB). The SIB and MIB for a cell include the basic information a mobile device uses to operate within the cell. Each of NC Mode, CE Mode A, and CE Mode B uses a different instance of SIB1 and SIB2. Thus, in order to operate in the new mode (i.e., the mode to which the mobile device is switching), the mobile device obtains the contents of the other mode's SIB1 and SIB2 before the switch is performed. The information from SIB1 and SIB2 can be provided in the radioResourceConfigCommon in the mobilityControlInformation. This includes the parameters:

fdd-DownlinkOrTddSubframeBitmapBR; fdd-UplinkSubframeBitmapBR; and startSymbolBR.

This encapsulates the hopping pattern of the six RBs (the Cat M1 bandwidth) and the UL-DL subframe configuration for half duplex.

As discussed above, there is a need for improved techniques to extend and complete a positioning session before an inter-base station handover, especially for mobile devices operating in LTE Cat M1. The techniques of the present disclosure exploit the use of CE Mode to enable a mobile device to stay connected to the same cell instead of triggering a handover.

Currently, when the signal strength of the serving cell is decreasing, the network (e.g., core network 204 or location server 270) can do one of two things—either trigger a handover of the mobile device to a stronger cell or trigger a CE mode in the same cell if no neighboring cell is available. The techniques described herein add additional functionality to the mobile device to emulate behavior that will cause the network to trigger a transition to a CE Mode instead of triggering a handover.

This functionality can be applied selectively when (1) the mobile device knows that the current serving cell supports CE Mode, (2) there is an ongoing positioning session, (3) the mobile device's current signal strength is deteriorating and likely to trigger a handover, and (4) the mobile device does not have sufficient measurement results to report for the current early reporting standard. Causing the network to trigger a CE Mode increases the likelihood that the mobile device will be able to collect sufficient positioning measurements to report to the location server (e.g., location server 270) to enable the location server to determine an accurate position estimate for the mobile device. Once the positioning session ends, the mobile device will default to the legacy implementation (i.e., permitting a handover).

FIG. 7A illustrates an exemplary portion of pseudocode 700A for a conventional downlink measurement configuration message from the network (e.g., location server 270) that specifies the measurement objects (e.g., Reference Signal Received Power (RSRP), Reference Signal Received Quality (RSRQ), or the like of the serving cell) the mobile device is to monitor and periodically report back to the network. The message also instantiates the events that are triggered if the conditions associated with the measurement objects are satisfied. The network can trigger a handover based on the event reports (e.g., signal strength measurements) in the mobile device's response to the measurement configuration message, referred to as a "report configuration" because it includes the measurements the mobile device was configured to report.

In the event that the mobile device is engaged in an ongoing positioning session (e.g., the method illustrated in FIG. 5) and the measurement objects the mobile device is monitoring indicate that, if reported to the network, the network would instruct the mobile device to handover to a new cell, the mobile device can blank all report configurations (i.e., report blank measurements for the serving cell, for example, report blank RSRP, blank RSRQ, etc.) until the timeout of the positioning session or alter the reported RSRP/RSRQ measurements of the neighboring cell(s) (to make them appear undesirable for handover) until the positioning session is over. This is illustrated by the exemplary pseudocode 700B in FIG. 7B.

The mobile device can send the report configuration such that an event that would trigger a handover is not reported (by blanking the measurements that would trigger a handover) and therefore not triggered by the mobile device. In addition, the mobile device can report altered RSRP/RSRQ results by adding a negative ("-ve") offset that is configurable based on the conditions of the wireless network environment of the mobile device. Once the mobile device blanks the signal strength measurements of the serving cell and/or sends the altered measurements of the neighboring cells, the network will trigger the mobile device to operate in CE Mode. More specifically, to allow a transition from NC Mode to CE Mode, the network provides the appropriate SIB1 and SIB2 for the chosen CE Mode (A or B) in a radioResourceConfigCommon message while the mobile device is still in NC Mode. Using this information, the mobile device is able to move to CE Mode in the same cell.

Figure 8:
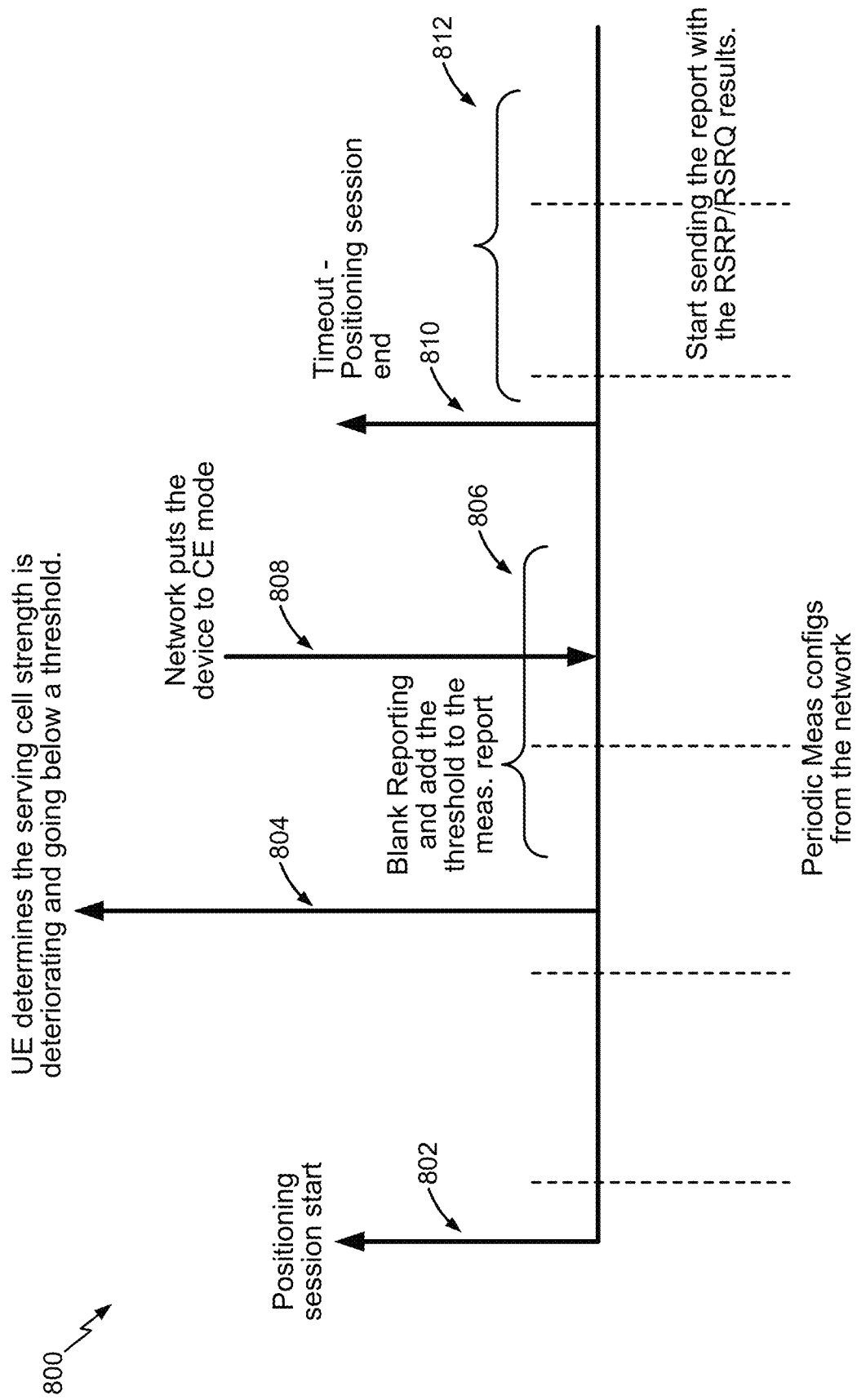
FIG. 8 illustrates an exemplary timeline of the enhanced positioning method described herein.

FIG. 8 illustrates an exemplary timeline 800 of the enhanced positioning method described herein. At 802, a positioning session (e.g., the method illustrated in FIG. 5) begins. At 804, the mobile device (a UE in LTE) determines that the strength of the serving cell (e.g., a small cell or macro cell base station) is deteriorating and has fallen below a threshold. In response, at 806, the mobile device reports blank measurements to the network (e.g., location server 270) and/or adds an offset (e.g., a negative offset) to the measurements of the neighboring cells reported to the network (i.e., report blank measurements for the neighboring cell, for example, report blank RSRP, blank RSRQ, etc.). Because of the measurement reports from the mobile device, at 808, the network transitions the mobile device into CE Mode (A or B). At 810, either the positioning session times out or it ends. At 812, the mobile device begins sending measurement reports to the network that include the correct measurements of the neighboring cells. At that point, the network can determine whether to trigger a handover of the mobile device to a different cell, or to keep it in CE Mode. Further, as illustrated by the dashed lines, during the timeline 800, the network continues to send periodic measurement configuration messages to the mobile device, to which the mobile device responds with the modified reports at 806 and the accurate reports at 812.

Figure 9:
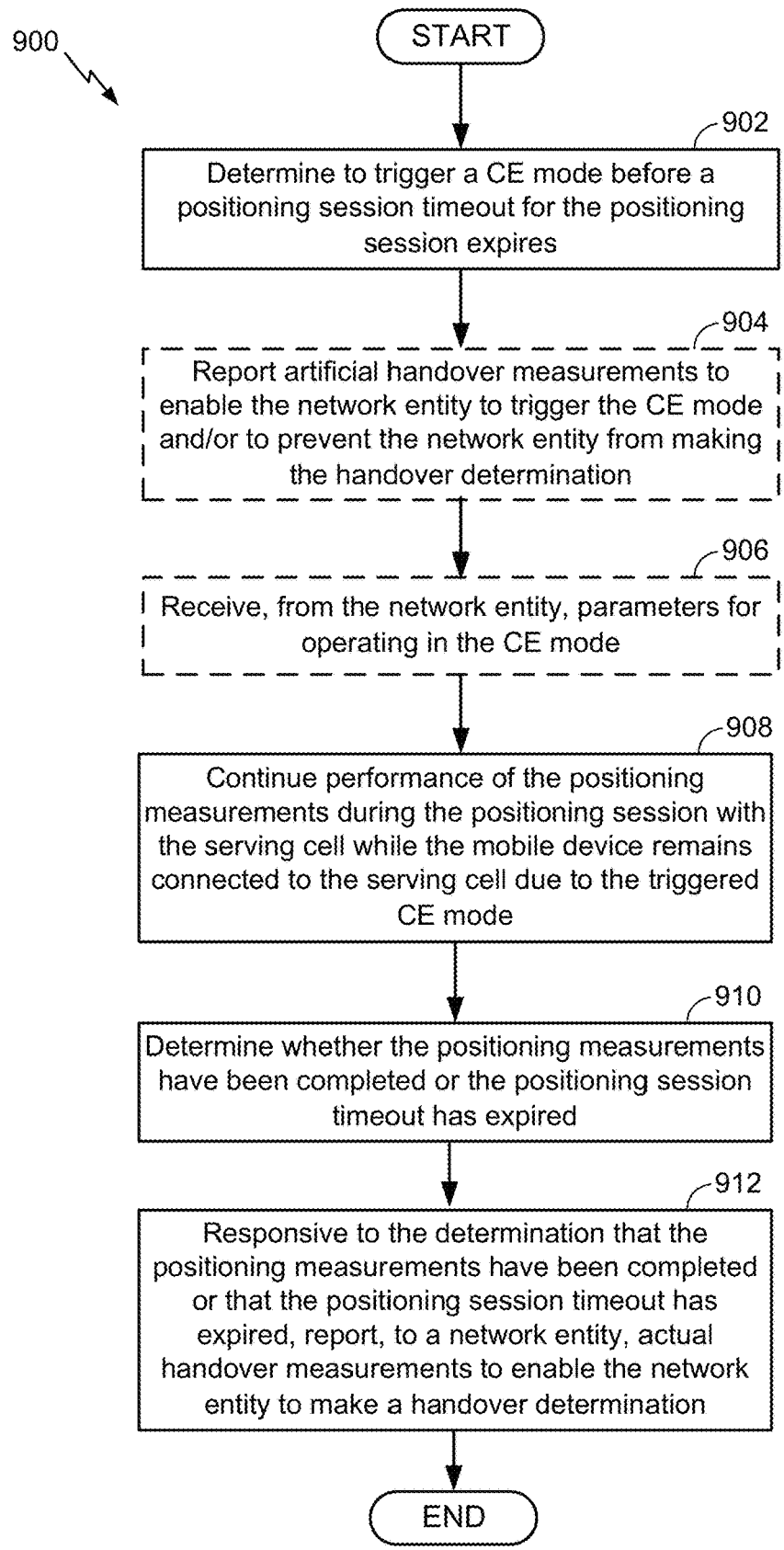
FIG. 9 is a flow diagram illustrating an example method of performing positioning measurements at a mobile device during a positioning session with a serving cell within a wireless communications network.

FIG. 9 is a flow diagram illustrating an example method 900 of performing positioning measurements at a mobile device during a positioning session with a serving cell within a wireless communications network. In an aspect, the wireless communications network may be a narrowband wireless communications network, such as an LTE Cat M1 network. The method 900 may be performed by, for example, a mobile device, such as mobile device 120.

At 902, the mobile device 120 (e.g., processor(s) 305 or handover manager 122, based on information about the wireless communications network obtained from the wireless communications interface 330) determines to trigger a CE mode (e.g., CE Mode A or B) before a positioning session timeout for the positioning session expires. The mobile device 120 may be operating in NC Mode at the time of the determination. In an aspect, the determination at 902 may include determining whether the serving cell supports the CE mode, determining whether the performance of the positioning measurements may not be complete before a handover is triggered by the network entity, determining whether a signal strength of the serving cell is below a threshold and the network entity is likely to trigger a handover before the performance of the positioning measurements is complete, and determining that the mobile device does not have sufficient positioning measurements to report to the network entity, or any combination thereof.

At 904, responsive to the determination to trigger the CE mode at 902, the mobile device 120 (e.g., wireless communications interface 330, as directed by processor(s) 305 or handover manager 122) may optionally report, to a network entity (e.g., location server 270) in the wireless communications network, artificial handover measurements to enable the network entity to trigger the CE mode and/or to prevent the network entity from making the handover determination. In an aspect, the artificial handover measurements may include blank signal strength measurements for the serving cell and/or offset signal strength measurements for at least one neighboring cell, as described above. In an aspect, the offset signal strength measurements may be generated by offsetting actual signal strength measurements for the at least one neighboring cell. In an aspect, the signal strength measurements may be RSRP or RSRQ measurements.

At 906, responsive to reporting the artificial handover measurements at 904, the mobile device 120 (e.g., processor(s) 305 or handover manager 122 via the wireless communications interface 330) may optionally receive, from the network entity, parameters for operating in the CE mode. In an aspect, the parameters for operating in the CE mode may be at least one SIB of the serving cell for the CE mode. For example, the at least one SIB may include the SIB1 and SIB2 of the serving cell, as described above.

At 908, the mobile device 120 (e.g., wireless communications interface 330, as directed by processor(s) 305 or handover manager 122) continues performance of the positioning measurements during the positioning session with the serving cell while the mobile device 120 remains connected to the serving cell due to the triggered CE mode. In an aspect, the mobile device 120 may perform the positioning measurements as described above with reference to FIG. 5.

At 910, the mobile device 120 (e.g., processor(s) 305 or handover manager 122, based on information from the wireless communications interface 330) determines whether the positioning measurements have been completed or the positioning session timeout has expired.

At 912, responsive to the determination that the positioning measurements have been completed or that the positioning session timeout has expired, the mobile device 120 (e.g., wireless communications interface 330, as directed by processor(s) 305 or handover manager 122) reports, to the network entity, actual handover measurements to enable the network entity to make a handover determination. In an aspect, the actual handover measurements may include actual signal strength measurements for the serving cell and/or actual signal strength measurements for at least one neighboring cell.

In an aspect, means for performing operations 902, 908, and 910 may include processor(s) 305 or handover manager 122, and means for performing operations 904, 906, 908, and 912 may include the wireless communications interface 330.

In addition to the UE-directed solution described above, the present disclosure also provides a network-directed solution. In this solution, the mobile device can request that it be switched to CE mode, and based on the request, the serving base station can decide whether or not to switch to the requested CE mode.

Figure 10:
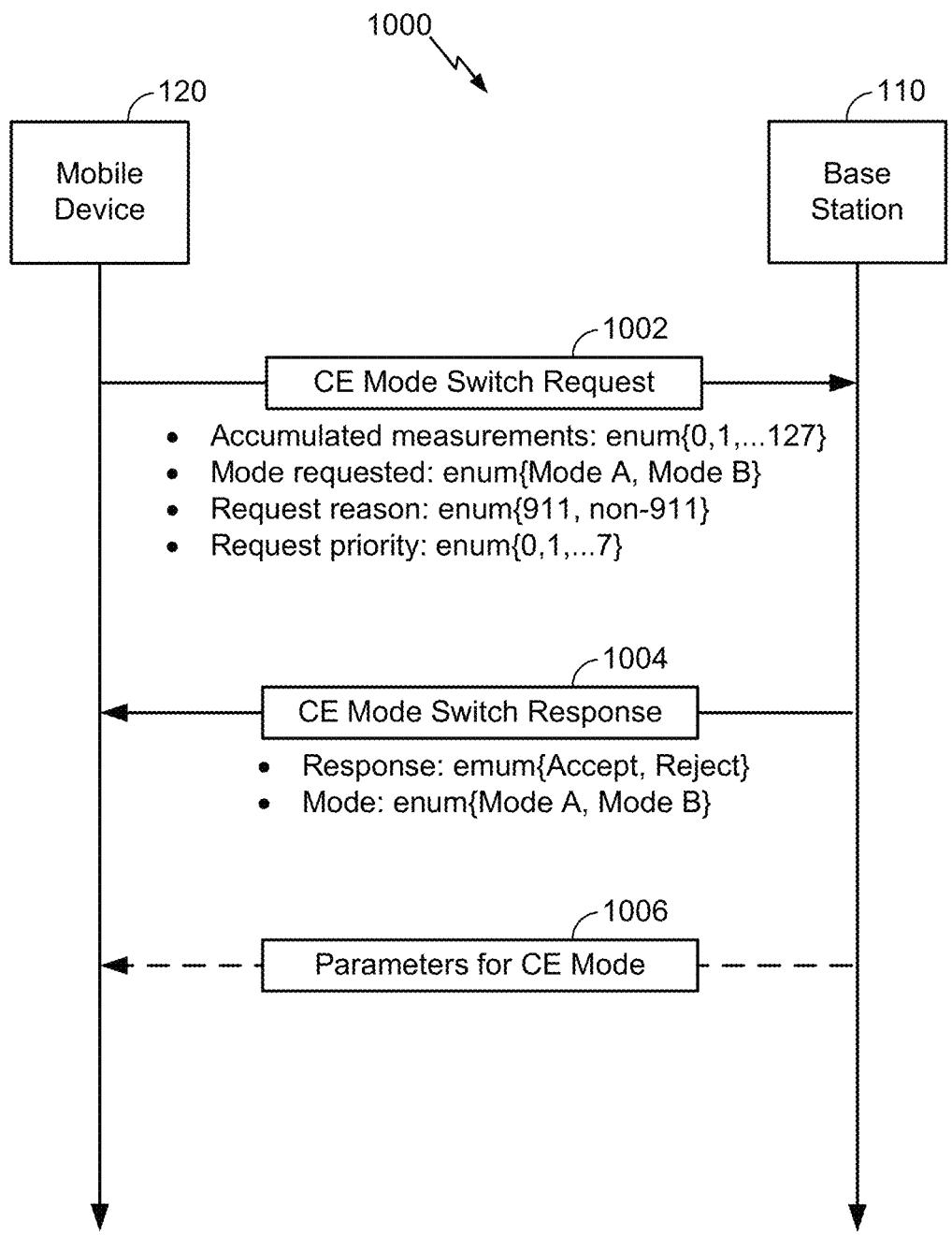
FIG. 10 illustrates an exemplary method for network-directed CE mode switching between a mobile device and a serving base station.

FIG. 10 illustrates an exemplary method 1000 for network-directed CE mode switching between a mobile device 120 and a serving base station 110 (e.g., a small cell or macro cell base station). At 1002, the mobile device 120 sends a CE mode switch request to the base station 110 requesting that the base station 110 switch to CE mode. The mobile device 120 can request either "CE Mode A" or "CE Mode B" in the message. The mobile device 120 may also specify a reason for requesting the mode switch. For example, if the current accumulated positioning measurements are insufficient for positioning or for early reporting to the network (e.g., location server 270), the mobile device 120 can request CE Mode B, as that mode provides deeper coverage and would allow more time to accumulate positioning measurements.

In an aspect, the CE mode switch request may be a radio resource control (RCC) message, referred to as an "RRC CE mode switch request" message. The CE mode switch request message may include the number of accumulated positioning measurements (e.g., a value from 0 to 127), the CE mode requested (e.g., CE Mode A or CE Mode B), the reason for the request (e.g., an emergency (911) call or a non-emergency call), and a priority of the request (e.g., a value from 0 to 7). Below is an example of the contents of the RRC CE mode switch request message:

c1: rrcConnectionCEmodeSwitchRequest (0)
    rrcConnectionCEmodeSwitchRequest
        criticalExtensions: rrcConnectionCEmodeSwitchRequest-r16(0)
            rrcConnectionCEmodeSwitchRequest-r16
                ue-Identity
                    c-RNTI: 0000
                    physCellId: 0
                    shortMAC-I: 0000
                Accumulated measurements: enum {0, 1, . . . 127}
                Mode Requested: enum {Mode A, Mode B}
                Request Reason: enum {Emergency Call, Non-Emergency Call}
                Request Priority: {0, 1, . . . 7}//based on the application
            Spare: 32

At 1004, based on the request received at 1002, the base station 110 sends a CE mode switch response message to the mobile device 120. The base station 110 can take into account the reason for the switch specified in the request, determine the priority and nature of the application that is requesting a position fix, and either accept or reject the request. The CE mode switch response message may include the response ("accept" or "reject") and the selected mode (CE Mode A or CE Mode B), if the request is accepted.

In an aspect, the CE mode switch response message may be referred to as an "RRC CE mode switch response" message. Below is an example of the contents of the RRC CE mode switch response message:

c1: rrcConnectionCEmodeSwitchResponse(0)
    rrcConnectionCEmodeSwitchResponse
        criticalExtensions: rrcConnectionCEmodeSwitchResponse-r16(0)
            rccConnectionCEmodeSwitchResponse-r16
                ue-Identity
                    c-RNTI: 0000
                    physCellId: 0

Response: enum {Accept, Reject}
Mode: enum {CE Mode A, CE Mode B}
Spare: 00

At 1006, if the base station 110 determines to switch to a CE mode, the base station 110 sends a message to the mobile device 120 specifying the parameters for the transition to the selected CE mode.

Figure 11:
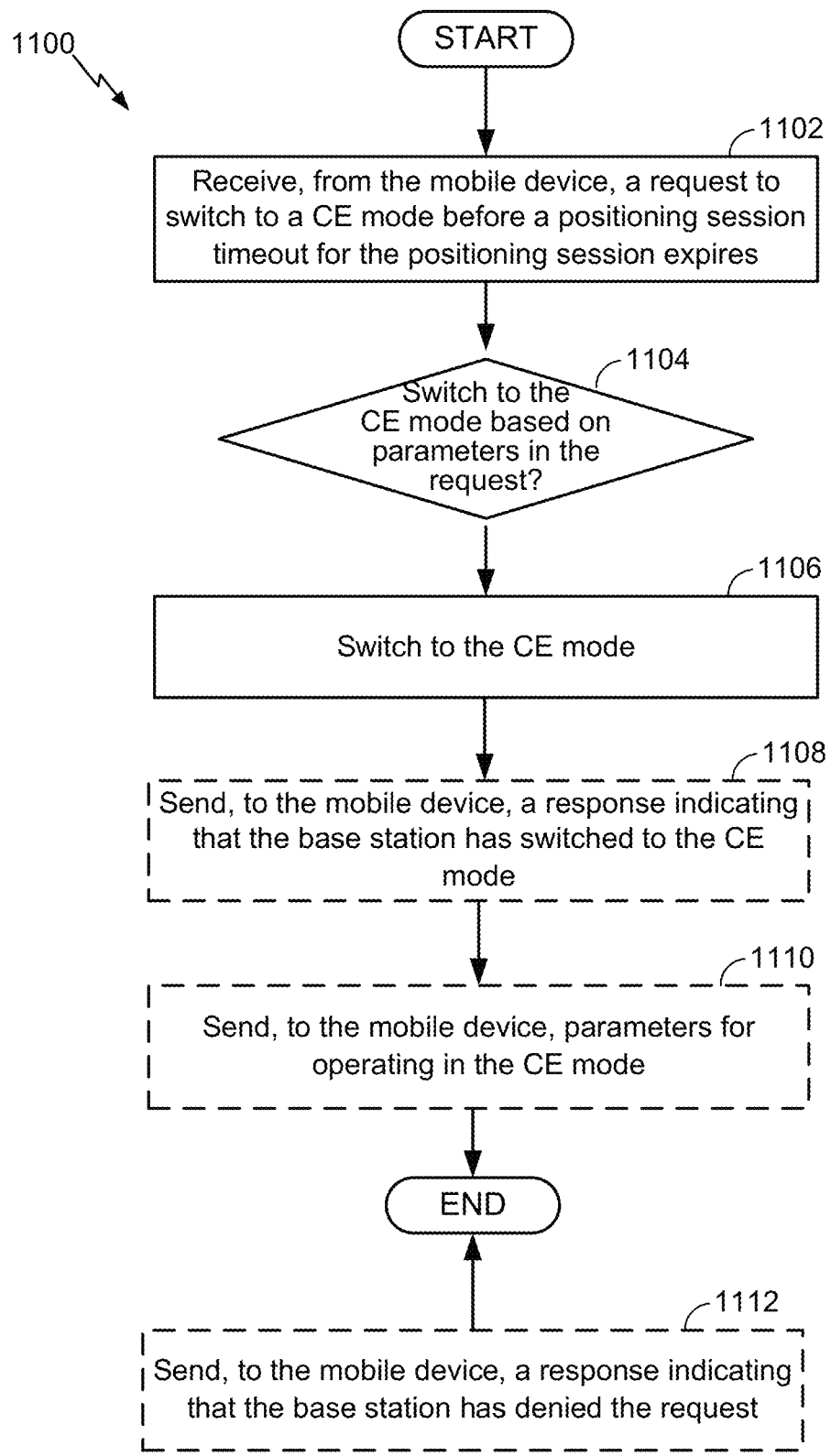
FIG. 11 illustrates an exemplary method for assisting performance of positioning measurements at a mobile device during a positioning session with a serving cell within a wireless communications network.

FIG. 11 illustrates an exemplary method 1100 for assisting performance of positioning measurements at a mobile device (e.g., mobile device 120) during a positioning session with a serving cell (e.g., base station 110) within a wireless communications network. The method 1100 may be performed by a base station 110 serving the mobile device 120, referred to as the "serving cell."

At 1102, the base station 110 (e.g., wireless communications interface 430) receives, from the mobile device 120, a request to switch to a CE mode (as described above with reference to 1002 of FIG. 10) before a positioning session timeout for the positioning session expires, as described above with reference to the mobile device-directed solution. For example, the mobile device 120 may send the request after the determination in 902, rather than performing operation 904 of method 900.

At 1104, the base station 110 (e.g., processor(s) 405 and/or handover manager 112) determines whether or not to switch to the CE mode based on parameters in the request, such as a type of the CE mode, a reason for the request, a priority of the request, and a number of positioning measurements performed during the positioning session before the request is sent by the mobile device 120, as described above with reference to 1004 of FIG. 10.

If the base station 110 (e.g., processor(s) 405 and/or handover manager 112) determines to switch to the CE mode, then at 1106, the base station 110 switches to the selected CE mode, as described above with reference to 1004 of FIG. 10.

At 1108, the base station 110 (e.g., wireless communications interface 430, optionally as directed by processor(s) 405 and/or handover manager 112) optionally sends, to the mobile device 120, a response indicating that the base station 110 has switched to the CE mode, as described above with reference to 1006 of FIG. 10. In an aspect, the response may include a parameter indicating that the serving cell has accepted the request and a type of the CE mode to which it has switched. Alternatively, if the base station 110 determined not to switch to the CE mode at 1104, then at 1112, the base station 110 sends a response indicating that the base station 110 has denied the request.

At 1110, the base station 110 (e.g., wireless communications interface 430, optionally as directed by processor(s) 405 and/or handover manager 112) optionally sends parameters for operating in the CE mode to the mobile device 120, as described above with reference to 906 of FIG. 9.

In an aspect, means for performing operations 1102, 1108, and 1110 may include wireless communication interface 430, as directed by processor(s) 405 or handover manager 112, and means for performing operations 1104 and 1106 may include processor(s) 405 and/or handover manager 112.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the functionality. As another example, an integrated circuit may be fabricated to support the functionality and then configured (e.g., via programming) to provide the functionality. As yet another example, a processor circuit may execute code to provide the functionality.

Moreover, the methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for performing the positioning enhancements for narrowband mobile devices described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for assisting performance of positioning measurements by a mobile device during a positioning session with a serving cell within a wireless communications network, the method comprising:
    receiving, at the serving cell from the mobile device, a request to switch to a coverage-enhanced (CE) mode before a positioning session timeout for the positioning session expires;
    determining, by the serving cell, whether or not to switch to the CE mode based on parameters in the request; and
    based on determining to switch to the CE mode, switching, by the serving cell, to the CE mode.

2. The method of claim 1, further comprising:
    sending, by the serving cell to the mobile device, a response indicating that the serving cell has switched to the CE mode.

3. The method of claim 2, wherein the response includes a parameter indicating that the serving cell has accepted the request and a type of the CE mode.

4. The method of claim 1, wherein the parameters in the request include a type of the CE mode, a reason for the request, a priority of the request, and a number of positioning measurements performed during the positioning session before the request is sent by the mobile device.

5. The method of claim 4, wherein the priority of the request is based on an application requesting the positioning session.

6. The method of claim 1, further comprising:
    sending, by the serving cell to the mobile device, parameters for operating in the CE mode.

7. The method of claim 6, wherein the parameters for operating in the CE mode comprise at least one system information block (SIB) of the serving cell for the CE mode.

8. The method of claim 7, wherein the at least one SIB comprises a SIB1 and SIB2 of the serving cell.

9. The method of claim 1, wherein the CE mode comprises CE mode A or CE mode B, and wherein the serving cell operates in normal coverage (NC) mode before switching to the CE mode.

10. The method of claim 1, wherein the wireless communications network comprises a narrowband wireless communications network.

11. The method of claim 10, wherein the narrowband wireless communications network comprises a Long-Term Evolution (LTE) Category M1 network.

12. An apparatus for assisting performance of positioning measurements at a mobile device during a positioning session with a serving cell within a wireless communications network, comprising:
    one or more transceivers of the serving cell configured to receive, from the mobile device, a request to switch to a coverage-enhanced (CE) mode before a positioning session timeout for the positioning session expires; and
    one or more processors of the serving cell, either alone or in combination, configured to:
        determine whether or not to switch to the CE mode based on parameters in the request; and
        based on a determination to switch to the CE mode, switch to the CE mode.

13. The apparatus of claim 12, wherein the one or more processors, either alone or in combination, are further configured to:
    send, via the one or more transceivers, to the mobile device, a response indicating that the serving cell has switched to the CE mode.

14. The apparatus of claim 13, wherein the response includes a parameter indicating that the serving cell has accepted the request and a type of the CE mode.

15. The apparatus of claim 12, wherein the parameters in the request include a type of the CE mode, a reason for the request, a priority of the request, and a number of positioning measurements performed during the positioning session before the request is sent by the mobile device.

16. The apparatus of claim 15, wherein the priority of the request is based on an application requesting the positioning session.

17. The apparatus of claim 12, wherein the one or more processors, either alone or in combination, are further configured to:
    send, via the one or more transceivers, to the mobile device, parameters for operating in the CE mode.

18. The apparatus of claim 17, wherein the parameters for operating in the CE mode comprise at least one system information block (SIB) of the serving cell for the CE mode.

19. The apparatus of claim 12, wherein the CE mode comprises CE mode A or CE mode B, and wherein the serving cell operates in normal coverage (NC) mode before switching to the CE mode.

20. An apparatus for assisting performance of positioning measurements at a mobile device during a positioning session with a serving cell within a wireless communications network, comprising:
    means of the serving cell for receiving, from the mobile device, a request to switch to a coverage-enhanced (CE) mode before a positioning session timeout for the positioning session expires;
    means of the serving cell for determining whether or not to switch to the CE mode based on parameters in the request; and
    means of the serving cell for switching, based on determining to switch to the CE mode, to the CE mode.

* * * * *